US009395977B2

(12) United States Patent
Dangeville et al.

(10) Patent No.: US 9,395,977 B2
(45) Date of Patent: Jul. 19, 2016

(54) LOCATING PROGRAM CODE UNITS AFTER SOFTWARE REFACTORING

(71) Applicant: International Business Machines Corporation, Armonk, NY (US)

(72) Inventors: Nicolas Dangeville, Paris (FR); Thierry Matusiak, Bois-Colombes (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 117 days.

(21) Appl. No.: 13/924,061

(22) Filed: Jun. 21, 2013

(65) Prior Publication Data

US 2014/0026118 A1    Jan. 23, 2014

(30) Foreign Application Priority Data

Jul. 19, 2012  (GB) .................................. 1212837.7

(51) Int. Cl.
*G06F 9/44* (2006.01)

(52) U.S. Cl.
CPC ... *G06F 8/70* (2013.01); *G06F 8/72* (2013.01)

(58) Field of Classification Search
CPC ..................................... G06F 8/70; G06F 8/72
USPC .................................................. 717/120–123
See application file for complete search history.

(56) References Cited

U.S. PATENT DOCUMENTS

| 5,905,990 | A | 5/1999 | Inglett |
| 6,681,382 | B1 * | 1/2004 | Kakumani ................ G06F 8/71 707/999.103 |
| 6,804,682 | B1 * | 10/2004 | Kemper et al. |
| 7,818,730 | B1 | 10/2010 | Ryan et al. |
| 8,020,146 | B2 | 9/2011 | Hudson, Jr. |
| 8,561,036 | B1 * | 10/2013 | Beans et al. .................. 717/140 |
| 2007/0027692 | A1 | 2/2007 | Sharma et al. |
| 2008/0320438 | A1 * | 12/2008 | Funto et al. .................. 717/106 |
| 2009/0019426 | A1 | 1/2009 | Baeumer et al. |
| 2009/0028809 | A1 | 1/2009 | Thurgood et al. |
| 2011/0035726 | A1 | 2/2011 | Davies et al. |

(Continued)

FOREIGN PATENT DOCUMENTS

GB     2504122 A     7/2012

OTHER PUBLICATIONS

"Code analysis with pattern matching to provide automated code refactoring," [online] IP.com Prior Art Database, Disclosure No. IPCOM000178035D, Jan. 14, 2009, retrieved from the Internet: <http://ip.com/IPCOM/000178035>, 3 pgs.

(Continued)

*Primary Examiner* — Qing Chen
(74) *Attorney, Agent, or Firm* — Cuenot, Forsythe & Kim, LLC (57) ABSTRACT

Locating program code units stored on digital data storage includes defining a software module fragment by assigning a software module fragment label to selected program code units, creating a module fragment list defining a software module, said list comprising a set of said software module fragments, receiving a request to retrieve the program code units of a specified software module from the digital data storage, and converting, using a processor, the module fragment list of the specified module into a list of physical locations for resolving the locations of the corresponding program code units on the digital data storage using said labels.

17 Claims, 4 Drawing Sheets

(56) References Cited

U.S. PATENT DOCUMENTS

| | | |
|---|---|---|
| 2011/0083118 A1 | 4/2011 | Moore |
| 2013/0080997 A1* | 3/2013 | Dattathreya .................. 717/121 |
| 2013/0290928 A1* | 10/2013 | Johnson ....................... 717/109 |
| 2014/0165035 A1* | 6/2014 | Campbell et al. ............. 717/121 |
| 2014/0223415 A1* | 8/2014 | van Gogh et al. ............. 717/123 |
| 2014/0245258 A1* | 8/2014 | Frenkiel et al. ............... 717/120 |

OTHER PUBLICATIONS

UK Appln. No. 1212837.7, Search Report, Nov. 20, 2012, 4 pg.

* cited by examiner

LOCATING PROGRAM CODE UNITS AFTER SOFTWARE REFACTORING

CROSS-REFERENCE TO RELATED APPLICATIONS

This application claims the benefit of United Kingdom Application Number 1212837.7 filed on Jul. 19, 2012, which is fully incorporated herein by reference.

BACKGROUND

In software development, it is good design practice to build applications using a large number of small and distinct modules or projects, because this promotes reuse of such building blocks, thereby improving scalability and reducing complexity of the development task, as small modules or projects are less likely to be application specific, or in other words, are more likely to be reusable.

However, a downside of having high granularity is that a large number of different modules or projects co-exist, which inter alia complicates the data integrity in terms of file location. For instance, some of the building blocks of a software project, e.g., folders or files, may be moved to another location when being reused, e.g., during project refactoring, or when being updated or otherwise amended.

This can cause problems when refactoring (parts of) an existing application, for instance when a source file comprises a reference to another source file that may have been moved to another location, or when an existing project or module has been split into smaller portions, such that some of the folders and files of the project or module have moved to a new location. A compiler typically will try and locate such a building block based on a search path, with the compiler returning an error if the building block can no longer be found in the given physical location. Upon the occurrence of such an error, the compilation process must be repaired, i.e., the search paths to the physical locations of the files must be corrected. For software development environments comprising many of such building blocks this can be a cumbersome exercise, as the developer of the corrupted compilation process usually has no knowledge of the subsequent use and the new location of the desired building blocks of the software module or project, such that a time-consuming file search must be applied to retrieve the new location of these building blocks. This task can easily become unmanageable when a software project is defined by a large number of building blocks.

In order to facilitate such a task, solutions exist that offer a level of indirection. For instance, compilation management solutions such as Imake provide mechanisms to abstract project dependencies by declaring variables that point to physical locations, in which each variable may represent a set of file paths, and use these variables when defining compilation search paths.

For instance, such a variable-based search path may take the form of BUILD_PATH=DATABASE, USER_INTERFACE, BUSINESS_LOGIC, EIGEN in which "DATABASE", "USER_INTERFACE", "BUSINESS_LOGIC" and "EIGEN" are the variables of the build path, with each variable representing the physical locations of a set of associated building blocks such as a file or folder, e.g., DATABASE=\u\workspace\accessor\db\;\u\workspace\db2_persistence\ in which the source files in the folders db and db2_persistence define the DATABASE part of the build path.

Nevertheless, the software project belonging to this build path may be refactored, and the search paths for a variable may change as a result. For instance, for the above example, the building block \u\workspace\accessor\db\ may be refactored into two smaller building blocks: \u\workspace\accessor-framework\db\ and u\workspace\accessor-logic\db\, such that the new value for the DATABASE variable becomes: DATABASE=\u\workspace\accessor-framework\db\; u\workspace\accessor-logic\db\; \u\workspace\db2_persistence\. This refactoring requires user intervention, e.g., because aliasing algorithms cannot cope with the change in granularity.

BRIEF SUMMARY

A method of locating program code units stored on digital data storage includes defining a software module fragment by assigning a software module fragment label to selected program code units, creating a module fragment list defining a software module, wherein the list includes a set of said software module fragments, and receiving a request to retrieve the program code units of a specified software module from the digital data storage. The method further includes converting, using a processor, the module fragment list of the specified module into a list of physical locations for resolving the locations of the corresponding program code units on the digital data storage using said labels.

A system for locating program code units stored on digital data storage includes a processor programmed to initiate executable operations. The executable operations include defining a software module fragment by assigning a software module fragment label to selected program code units, creating a module fragment list defining a software module, wherein the list includes a set of said software module fragments, and receiving a request to retrieve the program code units of a specified software module from the digital data storage. The executable operations further include converting the module fragment list of the specified module into a list of physical locations for resolving the locations of the corresponding program code units on the digital data storage using said labels.

A computer program product for locating program code units stored on digital data storage includes a computer readable storage medium having program code stored thereon. The program code is executable by a processor to perform a method. The method includes defining, using the processor, a software module fragment by assigning a software module fragment label to selected program code units, creating, using the processor, a module fragment list defining a software module, wherein the list includes a set of said software module fragments, and receiving, using the processor, a request to retrieve the program code units of a specified software module from the digital data storage. The method further includes converting, using the processor, the module fragment list of the specified module into a list of physical locations for resolving the locations of the corresponding program code units on the digital data storage using said labels.

BRIEF DESCRIPTION OF THE SEVERAL VIEWS OF THE DRAWINGS

Preferred embodiments of the present invention will now be described, by way of example only, with reference to the following drawings, in which.

DETAILED DESCRIPTION

The present invention relates to a method of locating software units that form part of a software module on digital data storage and a method of refactoring a software module using such a location method. The present invention further relates to a computer program product facilitating executing such methods. The present invention yet further relates to a system for executing the computer program of the computer program product. The present invention yet further relates to a digital data storage comprising software units.

The present invention seeks to provide a more robust method of locating program code units on digital data storage, a more robust method of software module refactoring, and a computer program product comprising a computer-readable storage medium having computer-readable program code implementing the steps of these methods.

The present invention further seeks to provide a system for executing the computer-readable program code and digital data storage that stores program code units in a manner that facilitates a more robust refactoring of a software module comprising these program code units.

According to an aspect of the present invention, there is provided a method of locating program code units stored on digital data storage, said program code units, the method comprising defining a software module fragment by assigning a software module fragment label to selected program code units; compiling a module fragment list defining a software module, said list comprising a set of said software module fragments; receiving a request to retrieve the program code units of a specified software module from the digital data storage; and converting the module fragment list of the specified module into a list of physical locations for resolving the locations of the corresponding program code units on the digital data storage using said labels.

The present invention is based on the insight that by having program code units such as folders comprising source code files or the source code files themselves declaring themselves as part of a fragment of a software module, e.g., a software project or service, it is no longer necessary to keep the physical location of the program code units up to date in software modules are fragments thereof where applications such as compilers may need to physically retrieve the program code units. Instead, upon a programmer or compiler requesting access to the program code units of a software module, the fragment list of this module can be converted into a list of physical locations, i.e., search paths, of the program code units, e.g., by locating program code units on the digital data storage that have declared themselves as belonging to the software module fragment. Consequently, software developers can relocate program code units at will and even rename such units without this causing failure of subsequent processing (e.g., compilation) attempts.

In an embodiment, the method further comprises retrieving the program code units from the resolved physical locations on said digital data storage to make the program code units available for further processing, e.g., by a software developer or a compiler.

The program code units may be organized in a hierarchical structure that at least in part is software module-based. For instance, the hierarchical structure may comprise nested folders.

In an embodiment, the module fragment list is an ordered list based on the position of the fragment in the software module. This is particularly useful in case the program code units are made available to a compiler, such that the conversion of the ordered list yields a list of physical locations in compilation order.

In an embodiment, the method further comprises periodically determining the total number of labels of a software module fragment; comparing a later total number with an earlier total number; and creating a notification in case of a difference between the later total number and the earlier total number. This way, an owner of a software module fragment may be informed by an unintentional deletion or a third party modification of the software module fragment.

The conversion step may include searching the digital data storage for program code units relating to the software module based on said labels as previously explained. In an embodiment, said search step is limited to a hierarchical data structure defining said software module, e.g., a nested folder structure. This causes the list of physical locations to be generated more quickly, but can of course only be used if it is a priori known that all labels can be found within the hierarchical data structure.

In accordance with another aspect of the present invention, there is provided a method of processing a software module, comprising retrieving the software units of said module in accordance with an embodiment of the aforementioned method locating program code units on digital data storage and refactoring said module.

In an embodiment, the processing may for instance comprise recompiling the software module.

In another embodiment, the refactoring may comprise changing the program code unit composition of a software module fragment; and updating said labels in accordance with the changes to said composition.

In yet another embodiment, the refactoring may comprise changing the software module fragment composition of a software module; and updating the module fragment list in accordance with the changes to said composition.

The embodiments of this refactoring method are less likely to suffer from errors due to the fact that the physical locations of the program code units are generated on-the-fly, thus neutralizing the risk of such locations having become corrupted.

According to yet another aspect of the present invention, there is provided a computer program product comprising a computer-readable storage medium having computer-readable program code, when executed on a computer, causing the computer to implement the steps of the aforementioned program locating method and/or software module processing method.

According to yet another aspect of the present invention, there is provided a system comprising at least one processor and the aforementioned computer program product, wherein the at least one processor is adapted to execute said program code.

According to yet another aspect of the present invention, there is provided digital data storage for communicating with the aforementioned system of the present invention, the digital data storage comprising a plurality of program code units distributed over said digital data storage, wherein each unit comprises a label referring to a software module fragment; and a set of module fragments lists, each of said lists defining a software module in terms of a set of said software module fragments. Such a digital data storage improves the performance of said system due to the fact that the number of processing failures executed on said system is significantly reduced.

It should be understood that the Figures are merely schematic and are not drawn to scale. It should also be understood that the same reference numerals are used throughout the Figures to indicate the same or similar parts.

In the present application, where there is a reference to the execution of a method, it should be understood that at least some of the steps of the method are executed by a computer. In at least some of the embodiments, all steps of the computer-implemented method are executed by a computer.

Digital data storage may be any storage medium capable of storing data in digital form, such as a memory device, e.g., USB stick or memory chip, a writeable optical disk, e.g., CD or DVD, a hard disk, a collection of hard disks, e.g., a file storage architecture such as a storage area network or network attached storage, distributed digital data storage such as a cloud storage solution or another network accessible distributed storage solution and so on.

A software module may be a software application as defined in a software project, such as a software-based service or a collection of such services, a holistic user application, a message-oriented application and so on. A software module may be defined by one or more fragments, which may be defined in a particular order to define the software module. In case of the software module being defined by a single fragment, the software module fragment and the software module may be the same.

A software module fragment is a building block of a software module, such as a part of a software module defined by a variable. The software module fragment is typically defined by at least one program code unit, which may be defined in a particular order to define the software module fragment.

A program code unit is a building block of a software module fragment, and is a unit of information that can be processed in a transformation process, e.g., a compilation process. In an embodiment, a program code unit may be a folder comprising one or more source code files or may be a source code file instead.

Figure 1:
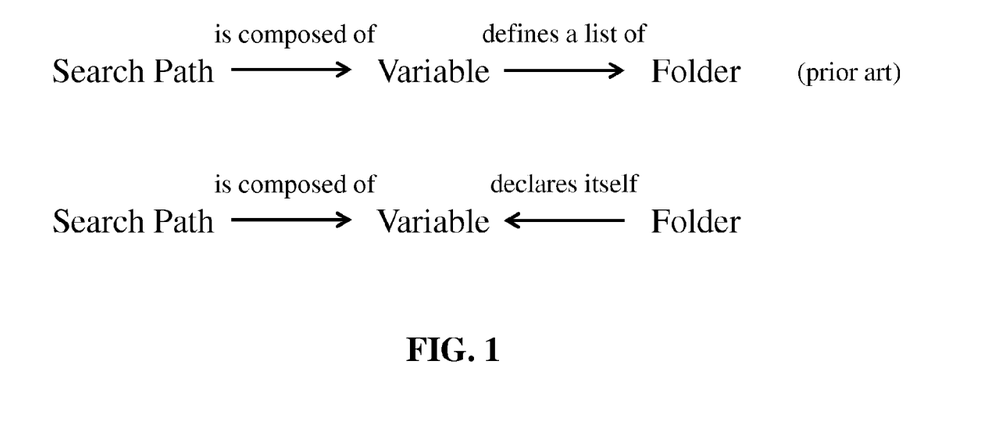
FIG. 1 schematically depicts a prior art search path and a search path according to an embodiment of the present invention.

FIG. 1 schematically depicts the differences between a prior art software development approach and at least some embodiments of the present invention at a conceptual level. Conventionally, a search path defining the physical locations of a software module may be composed of a set of variables, i.e., software module fragments, that each defines a list of folders, or more precisely a list of the physical locations of these folders. Hence, upon processing the software module, e.g., recompilation, the physical locations of the folders are accessed to retrieve the folders, or more precisely the source code files in the specified folders to build the software module using the specified variables.

However, if a folder is not in its specified location, the processing will fail. Unfortunately, the increasing reuse of variables or even program code units of particular variables in different software modules increases the likelihood of a software developer relocating program code units to a different software module in a different physical location, in which case the processing of a software module relying on the previous location of the program code units will fail if the physical locations of the program code units have not been updated in the appropriate variable of this software module.

This can be avoided by introducing design rules that prohibit the relocation of program code units but this is impractical as it severely compromises the transparency of the software design task.

Another reason why a physical location of a program code unit may no longer be accurate because the program code unit itself may have been redesigned, e.g., split into smaller granules, which changes again would have to be reflected in the software module fragment. As long as the roles of developing the software and maintaining the build parameters for the software are assumed by the same engineer, it can be expected that a software developer will amend the software module fragment to include the new physical locations that reflect the amended composition of the program code units of a given software module fragment, e.g., variable. However, as soon as the roles of software developer and release engineer are undertaken by two different people or teams, then such changes are made by a software developer who is unaware of the fact that the fragments of these altered modules now contain incorrect physical locations of the corresponding program code units, which can cause failures or at least complications in the processing (e.g., compilation) of these other software modules.

In summary, the fluidity of the structure and actual physical locations of program code units on digital data storage puts a great burden on software engineers that maintain the processing parameters as each relocation of (part of) a program code unit must be accompanied by an exhaustive search for co-dependent software modules to ensure that the changes in the physical locations of the shared program code units are correctly introduced in the appropriate fragments defining these co-dependent software modules. The software engineers that maintain a previous build are often unaware of the changes made by the software developers and have to discover or interact with them to understand and fix the appropriate variables e.g., the search path used by the processing (e.g., compilation) of the software. It will be immediately apparent that in large software development environments, e.g., environments comprising several hundreds of software modules, such a task is likely to fail. Even if search algorithms, e.g., refactoring aliases, are employed to determine the specification of a program code unit in a software module fragment, such search algorithms for instance cannot handle situations in which a program code unit has been previously renamed or split into smaller units.

At least some embodiments of the present invention address these problems by adding a label to a program code unit such as a folder or a source code file that acts as an identifier of the software module fragment to which the program code unit belongs, such that the program code unit can be seen as having declared itself to form a part of a software module fragment, e.g., a variable, as shown in FIG. 1. Even if the program code unit is relocated, refactored or renamed, it can still be recognized as part of the software module fragment by virtue of the label attached to the program code unit. In an embodiment, the labels are stored as metadata. This metadata can be handled by way of non-limiting example by side files or metadata facilities at file and folder level as for instance provided by a source code management system.

It should be understood that program code units may contain multiple of such labels, such that it can be immediately recognized by the software developer that the program code unit has been used in different software modules, i.e., in different software development projects. This in itself can provide valuable information as the software developer can investigate if one of the other software development projects contains variables suitable for use in the project that the software developer is currently working on.

Consequently, the software module fragment, e.g., a variable, can be dynamically defined as a list of program code units at a functional or logical level, rather than having to be maintained as a list of physical locations of the program code units that make up such a fragment, thus avoiding refactoring problems in case of changes to said physical locations that are not reflected in such a list. This concept is explained in more detail with the aid of UML representation shown in FIG. 2. Within a software development environment, a software module is defined at a logical or functional level by a logical or functional search path 210, which is made up by a set of, i.e., one or more, logical or functional search path fragments 212, i.e., a logical description of a software module fragment that serves as a reference source for program code units that make up the software module fragment. Hence, each logical search path 210 can be seen to describe at a logical level an ordered group of resources, e.g., variables, that defines a software module.

Figure 2:
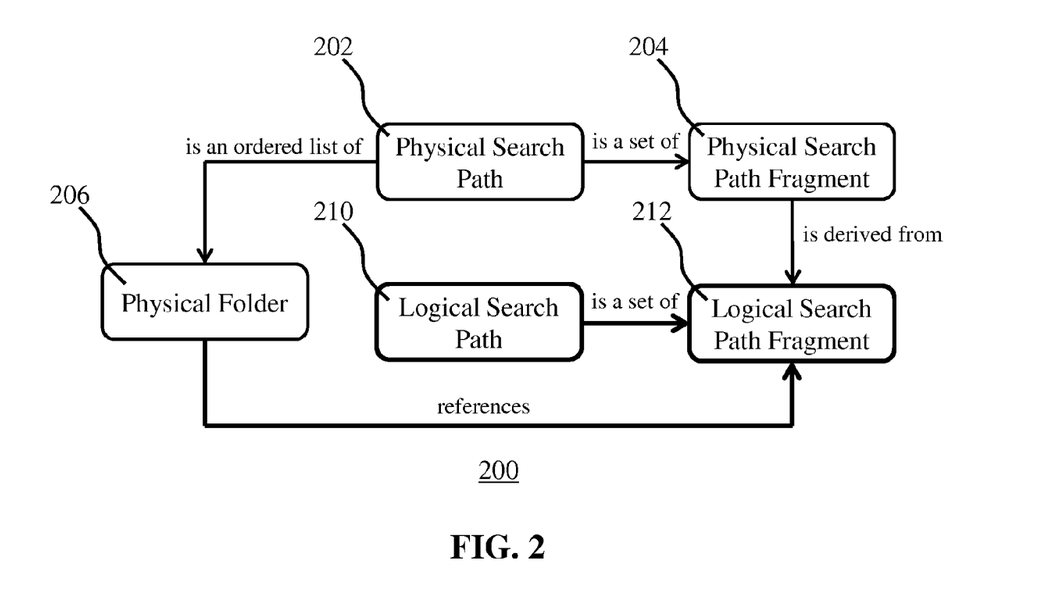
FIG. 2 schematically depicts a conceptual flow diagram of a method according to an embodiment of the present invention.

Each program code unit, here shown by way of non-limiting example as a folder 206, contains a reference, i.e., a label, to at least one of the logical search path fragment 212. It is important to note that the software module fragment represented by the logical search path fragment 212 typically does not need to have any contents; it simply acts as a common reference point or anchor for the labels of those program code units that belong to the same software module fragment.

The physical locations of the program code units can be retrieved from the logical search path fragment 212 to create a physical search path fragment 204, which is essentially a conventional software module fragment comprising a list of physical locations of the program code units that make up the software module fragment. This for instance can be achieved by a search algorithm that searches the digital data storage for program code units that comprise the appropriate label. It should be clear that as long as the label of a program code unit remains unaltered, the program code unit may be renamed or relocated without this causing a problem, as it will still be retrieved by the search algorithm.

In an embodiment, the search algorithm may be restricted to apply to only a part of the digital data storage that is reserved for the software module of interest, e.g., a hierarchical folder structure in which the top folder identifies the software module. This reduces the execution time of the search algorithm but can only be applied if it can be ensured that the program code units of interest have not been relocated to a different part of the digital data storage.

The physical search path or build path 202, is an ordered list of physical search path fragments 204 that define the software module, e.g., BUILD_PATH=\u\workspace\accessor-framework\db\; u\workspace\accessor-logic\db; \u\workspace\db2_persistence;\u\workspace\ui\frameworks; u\workspace\ui\utils; u\workspace\ui\pages; u\workspace\logic\core;u\workspace\logic\domain; u\workspace\ui\eigen; as in the example previously given, which allows, e.g., a compiler to build the software module based on the physical locations of the program code units that have been retrieved by the search algorithm as previously explained. Hence, due to the fact that the need for maintaining an up-to-date record of the physical locations of program code units no longer exists, a software refactoring method that is significantly more robust is provided.

Figure 3:
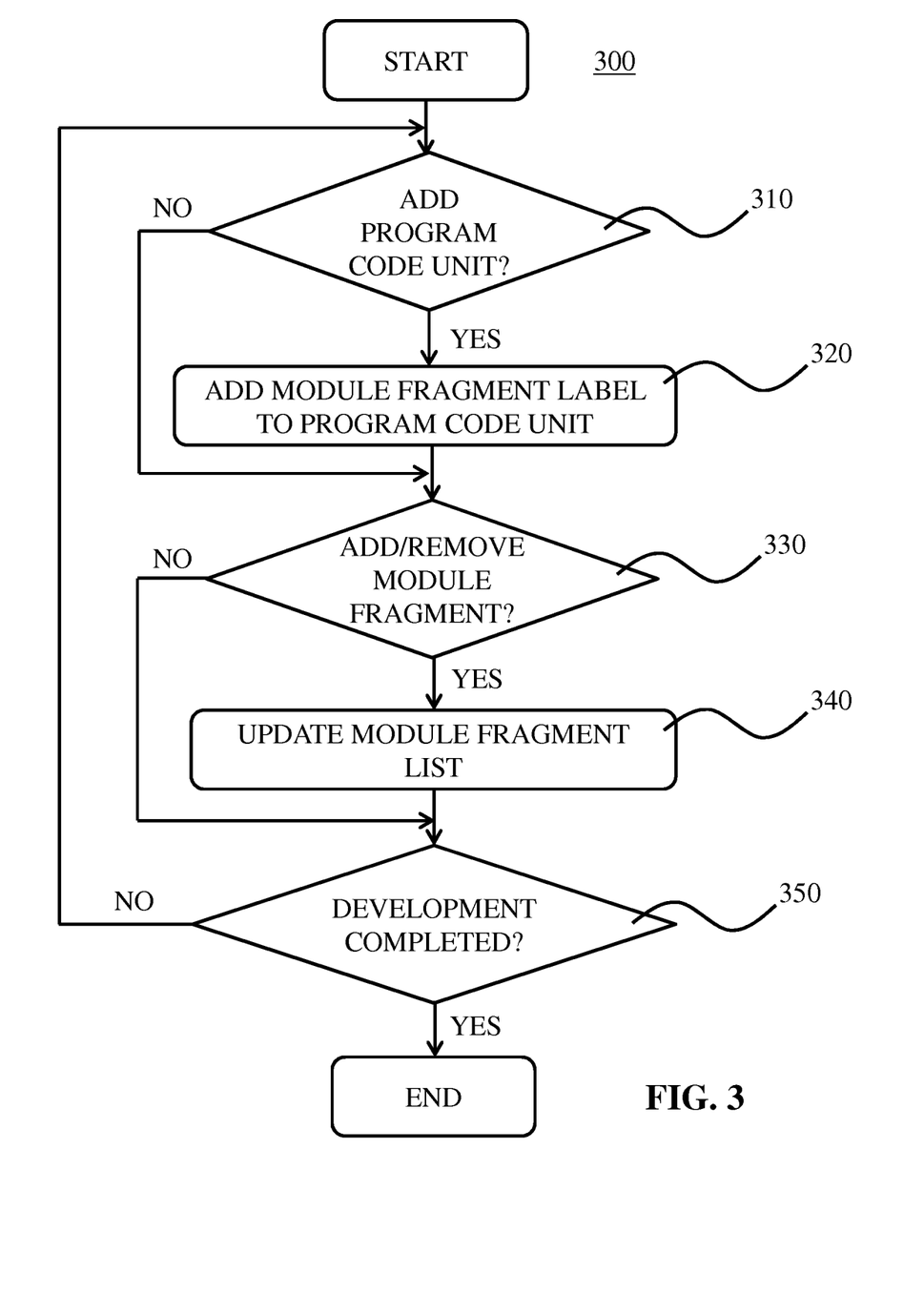
FIG. 3 schematically depicts a flow chart of an aspect of a method according to an embodiment of the present invention.

FIG. 3 discloses an aspect of an embodiment of a method 300 of the present invention, which explains in non-limiting terms how, e.g., a software developer may refactor software using the present method. The software programmer may for instance decide to add a program code unit to a software module fragment in step 310, in which case the method proceeds to step 320 where a reference or label to the relevant software module fragment is added to or included in the program code unit and stored on the digital data storage.

Instead or in addition thereto, the software developer may decide to add a software module fragment to or remove a software module fragment from the software module in step 330. In this case, the method proceeds to step 340 in which the software module fragment list, i.e., the definition of the software module in terms of an ordered list of software module fragments or variables, is updated accordingly, e.g., by the software developer, and stored on the digital data storage.

Next, it is checked in step 350 if the refactoring is complete, after which the method terminates in case of such a completion or otherwise reverts back to step 310, e.g., in case of a software developer wanting to add program code units to a newly defined software module fragment.

Figure 4:
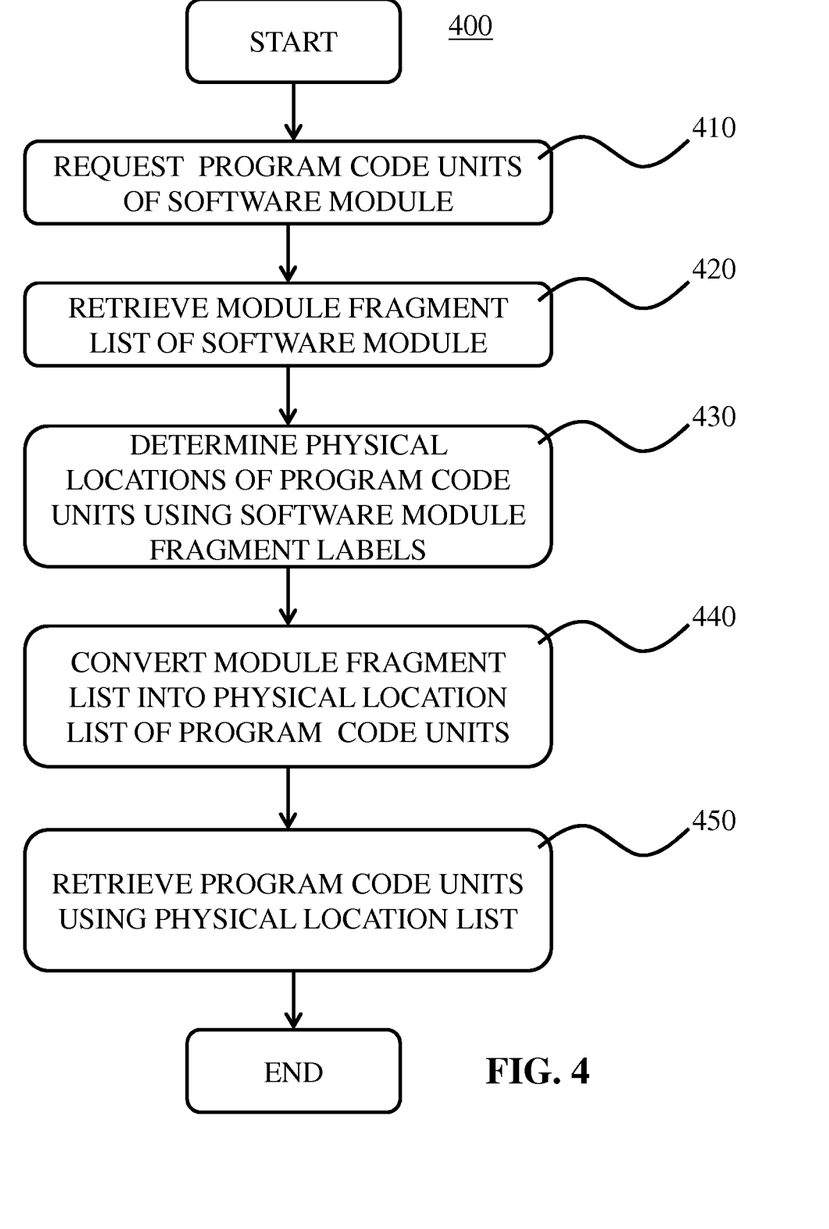
FIG. 4 schematically depicts a flow chart of another aspect of a method according to an embodiment of the present invention.

FIG. 4 discloses an aspect of an embodiment of another method of the present invention for locating program code units on the digital data storage. In step 410, a request is issued, e.g., by a compiler process or by a software developer, to retrieve the program code units that define a software module from the digital data storage, e.g., to (re)build the software module.

To this end, the method proceeds to step 420 in which the software module fragment list, i.e., the logical search path 210 is retrieved, which provides the ordered list of software module fragments represented by their logical search fragments 212.

In step 430, for each logical search fragment 212, the program code units, e.g., folders 206 or source code files, which have a label referring to the logical search fragment 212, are located on the digital data storage, such that the logical search path fragment 212 can be converted into a software module fragment comprising a list of physical locations or search paths of its program code units in step 440. In an alternative embodiment, steps 430 and 440 may be combined into a single step.

It should be understood that a search path may be used by a compiler to resolve a so-called include in a program code unit. For example, program code unit 'A' may include a reference to "foo", but the content of "foo" is located in /usr/includes/foo.abc. As long as the search path available to the compiler contains /usr/includes/, then the compiler will be able to resolve the include "foo" to the source file "foo.abc". Therefore, it should be understood that a list of software module fragments does not necessarily yield a complete representation of a software module in terms of search paths to its building blocks, but may include representations of where a compiler can resolve the building blocks of the software module. Such additional search paths may be provided to the compiler in any suitable manner.

Next, the program code units are retrieved in step 450, e.g., by the compiler in a software module compilation process or by the software developer for its own processing. Step 450 may also be omitted, e.g., in case a software developer is only interested in the physical locations where to resolve the program code units.

In addition to the above embodiments, the labels assigned to the program code units may be used for monitoring purposes, for instance to give a software developer or engineer a better insight into the (re)use of the program code units. For instance, an automated search algorithm may be periodically applied to list those program code units that have more than a predefined number of labels. In another example, a search algorithm may periodically determine the total number of program code units declaring itself to belong to a particular software module fragment, where the search algorithm may signal a change in the number of such program code units when comparing the actual search result with a previous search result.

The labels furthermore add diagnostic value to the software development and maintenance process. For instance, in case of a compilation error, the software developer or engineer can immediately evaluate the program code units considered in e.g., a compilation process by virtue of the program code units identified on the basis of their labels such that the software developer or engineer is not burdened with the task of having to trawl through the development history of the software module (if at all available) to figure out where and how a build has become corrupted. Other advantageous information providing applications of such labels will be apparent to the skilled person.

The various embodiments of the methods of the present invention may be implemented in any suitable manner. For instance, embodiments of the method of the present invention may be made available as a computer program product comprising a computer-readable storage medium, wherein the various steps of the method are stored on the computer-readable storage medium in the form of computer-readable program code that when executed on a suitably adapted computer, will cause the computer to execute the steps of such a method.

Figure 5:
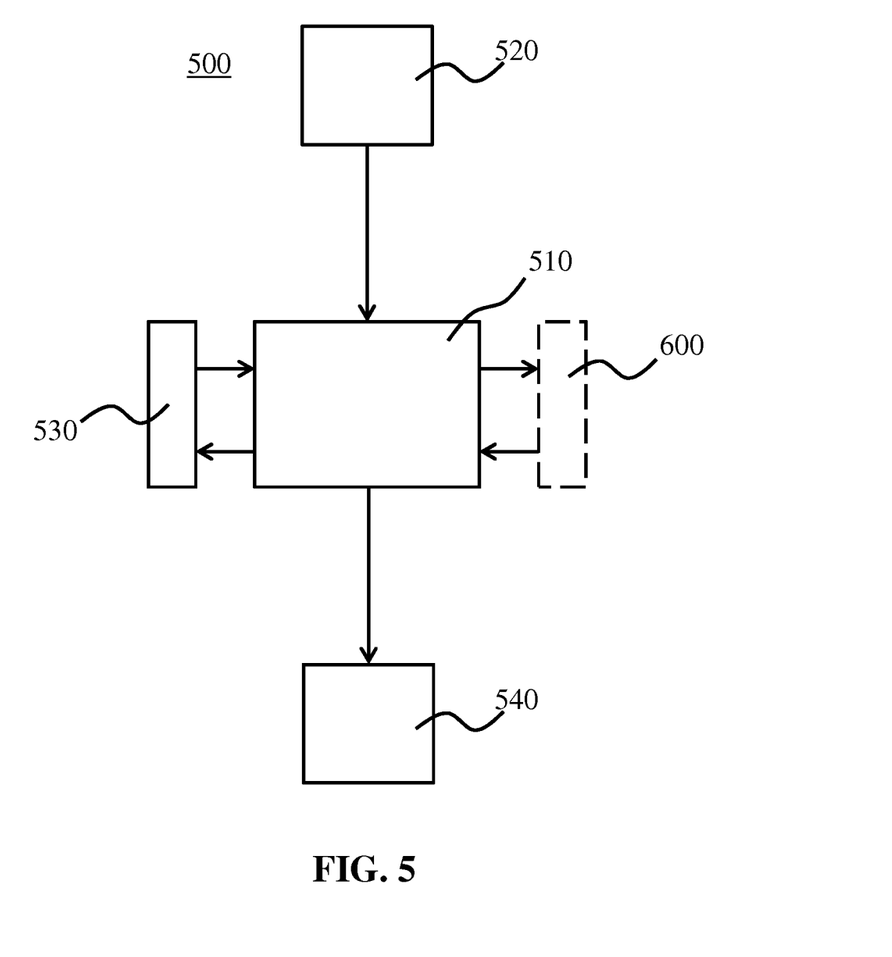
FIG. 5 schematically depicts a system according to an embodiment of the present invention.

A non-limiting example of a suitable system 500 for executing such a method is shown in FIG. 5. A computer system 500 comprises one or more processors 510 adapted to execute the computer program code stored on the aforementioned computer program product. An input device 520, a memory 530, which may be a distributed memory and an output device 540 are all communicatively coupled to the one or more processors 510.

The input device 520 may for instance be a keyboard, a mouse, a keypad, a touchscreen, a voice recognition device, a sensor, a network interface card (NIC), a Voice/video over Internet Protocol (VoIP) adapter, a wireless adapter, a telephone adapter, a dedicated circuit adapter, and so on.

The output device 540 may for instance be a printer, a plotter, a computer screen, a magnetic tape, a removable hard disk, a floppy disk, a NIC, a VoIP adapter, a wireless adapter, a telephone adapter, a dedicated circuit adapter, an audio and/or visual signal generator, a light emitting diode (LED), and so on.

The memory 530 may for instance be a cache, a dynamic random access memory (DRAM), a read-only memory (ROM), a hard disk, a floppy disk, a magnetic tape, an optical storage medium such as a compact disc (CD) or a digital versatile disc (DVD), and so on. The memory 530 typically stores the computer program code defining the method steps of one or more of the embodiments of present invention for execution by the one or more processors 510.

The system 500 is communicatively coupled to digital data storage 600, which comprises a plurality of program code units distributed over said digital data storage, wherein each unit comprises a label referring to a software module fragment and a set of module fragments lists, each of said lists defining a software module in terms of a set of said software module fragments. In an embodiment, the digital data storage 600 is separate from the system 500, in which case the system 500 may be adapted to access the digital data storage 600 over a network, e.g., a LAN or the Internet. In an alternative embodiment, the digital data storage 600 forms a part of the system 500. In yet another embodiment, the digital data storage 600 forms a part of the memory 530.

In operation, the at least one processor 510 may download the computer-readable program code from the memory 530, after which a software developer may instruct the at least one processor 510 using the input device 520 to access the digital data storage 600, e.g., to refactor a software module (fragment) stored on the digital data storage 600. The at least one processor 510, after executing this instruction, may forward a result of the execution of the instruction to the output device 540.

For instance, the software developer may instruct the system 500 to run a compilation process for a software module, in which case the at least one processor 510 executes the steps of the method of FIG. 4, with step 450 being executed in the compilation process.

In another example, the software developer may instruct the system 500 to add a software module fragment or variable to the definition of a software module stored on the digital data storage 600, in which case the at least one processor 510 executes at least some of the steps of the method shown in FIG. 3.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been described herein for purposes of illustration, many modifications and changes will be apparent to those skilled in the art.

What is claimed is:

1. A method of locating program code units stored on a digital data storage, the method comprising:
   defining, using a processor, a software module fragment by assigning a software module fragment label to a selected program code unit;
   creating, using the processor, a software module fragment list defining a software module, wherein the software module fragment list comprises a set of software module fragments;
   receiving, using the processor, a request to retrieve the selected program code unit of the defined software module from the digital data storage;
   converting, using the processor, the software module fragment list of the defined software module into a list of physical locations for resolving physical locations of corresponding program code units stored on the digital data storage using software module fragment labels;
   periodically determining a total number of software module fragment labels of a software module fragment;
   comparing a later total number of software module fragment labels of the software module fragment with an earlier total number of software module fragment labels of the software module fragment; and
   creating a notification in case of a difference between the later total number of software module fragment labels of the software module fragment and the earlier total number of software module fragment labels of the software module fragment.

2. The method of claim 1, further comprising retrieving the corresponding program code units from the resolved physical locations of the corresponding program code units stored on the digital data storage.

3. The method of claim 1, wherein the corresponding program code units are organized in a hierarchical structure stored on the digital data storage, and wherein the hierarchical structure is at least in part software module-based.

4. The method of claim 1, wherein the software module fragment list is an ordered list based on positions of the set of software module fragments in the software module.

5. The method of claim 1, wherein the selected program code unit is a folder, and wherein the folder comprises source code files of the software module fragment.

6. The method of claim 1, wherein the selected program code unit is a source code file.

7. The method of claim 1, wherein the conversion step includes searching the digital data storage for program code units relating to the set of software module fragments based on the software module fragment labels.

8. A system for locating program code units stored on a digital data storage, comprising:
   a processor programmed to initiate executable operations comprising:
   defining a software module fragment by assigning a software module fragment label to a selected program code unit;
   creating a software module fragment list defining a software module, wherein the software module fragment list comprises a set of software module fragments;

receiving a request to retrieve the selected program code unit of the defined software module from the digital data storage;

converting the software module fragment list of the defined software module into a list of physical locations for resolving physical locations of corresponding program code units stored on the digital data storage using software module fragment labels;

periodically determining a total number of software module fragment labels of a software module fragment;

comparing a later total number of software module fragment labels of the software module fragment with an earlier total number of software module fragment labels of the software module fragment; and creating a notification in case of a difference between the later total number of software module fragment labels of the software module fragment and the earlier total number of software module fragment labels of the software module fragment.

9. The system of claim 8, wherein the processor is further programmed to initiate an executable operation comprising retrieving the corresponding program code units from the resolved physical locations of the corresponding program code units stored on the digital data storage.

10. The system of claim 8, wherein the corresponding program code units are organized in a hierarchical structure stored on the digital data storage, and wherein the hierarchical structure is at least in part software module-based.

11. The system of claim 8, wherein the software module fragment list is an ordered list based on positions of the set of software module fragments in the software module.

12. The system of claim 8, wherein the selected program code unit is a folder, and wherein the folder comprises source code files of the software module fragment.

13. The system of claim 8, wherein the selected program code unit is a source code file.

14. The system of claim 8, wherein converting the software module fragment list of the defined software module into a list of physical locations for resolving physical locations of corresponding program code units stored on the digital data storage using software module fragment labels includes searching the digital data storage for program code units relating to the set of software module fragments based on the software module fragment labels.

15. A computer program product for locating program code units stored on a digital data storage, the computer program product comprising a computer readable storage medium having program code stored thereon, the program code executable by a processor to perform a method comprising:

defining, using the processor, a software module fragment by assigning a software module fragment label to a selected program code unit;

creating, using the processor, a software module fragment list defining a software module, wherein the software module fragment list comprises a set of software module fragments;

receiving, using the processor, a request to retrieve the selected program code unit of the defined software module from the digital data storage;

converting, using the processor, the software module fragment list of the defined software module into a list of physical locations for resolving physical locations of corresponding program code units stored on the digital data storage using software module fragment labels;

periodically determining a total number of software module fragment labels of a software module fragment;

comparing a later total number of software module fragment labels of the software module fragment with an earlier total number of software module fragment labels of the software module fragment; and creating a notification in case of a difference between the later total number of software module fragment labels of the software module fragment and the earlier total number of software module fragment labels of the software module fragment, wherein the computer readable storage medium does not consist of a transitory, propagating signal.

16. The computer program product of claim 15, further comprising retrieving the corresponding program code units from the resolved physical locations of the corresponding program code units stored on the digital data storage.

17. The computer program product of claim 15, wherein converting the software module fragment list of the defined software module into a list of physical locations for resolving physical locations of corresponding program code units stored on the digital data storage using software module fragment labels includes searching the digital data storage for program code units relating to the set of software module fragments based on the software module fragment labels.

* * * * *